United States Patent [19]

Schaffer

[11] Patent Number: 5,911,041
[45] Date of Patent: *Jun. 8, 1999

[54] METHOD FOR GENERALIZED WINDOWS APPLICATION INSTALL TESTING FOR USE WITH AN AUTOMATED TEST TOOL

[75] Inventor: Daniel H. Schaffer, Colorado Springs, Colo.

[73] Assignee: Sun Microsystems, Inc., Palo Alto, Calif.

[ * ] Notice: This patent is subject to a terminal disclaimer.

[21] Appl. No.: 08/979,728

[22] Filed: Nov. 26, 1997

Related U.S. Application Data

[62] Division of application No. 08/674,355, Jul. 1, 1996, Pat. No. 5,870,539.

[51] Int. Cl.$^6$ .................................................. G06F 15/60
[52] U.S. Cl. ........................................ 395/183.14; 395/704
[58] Field of Search ............................. 395/189.14, 704; 364/578

[56] References Cited

U.S. PATENT DOCUMENTS

| | | | |
|---|---|---|---|
| 4,991,176 | 2/1991 | Dahbura et al. | 371/27 |
| 5,233,611 | 8/1993 | Triantafyllos et al. | 371/16.1 |
| 5,394,347 | 2/1995 | Kita et al. | 364/578 |
| 5,500,941 | 3/1996 | Gil | 395/183.14 |
| 5,513,315 | 4/1996 | Tierney et al. | 395/183.13 |
| 5,542,043 | 7/1996 | Cohen et al. | 395/183.08 |
| 5,596,714 | 1/1997 | Connell | 395/183.14 |
| 5,600,790 | 2/1997 | Barnstijn et al. | 395/183.14 |
| 5,630,049 | 5/1997 | Cardoza et al. | 395/183.01 |
| 5,651,111 | 7/1997 | McKeeman et al. | 395/183.14 |
| 5,652,835 | 7/1997 | Miller | 395/183.14 |

OTHER PUBLICATIONS

Boris Belzar: "Software Testing Techniques—Second Edition, Chapter 11: States, State Graphs, and Transition Testing" 1990, Van Nostrand Reinhold, New York, pp. 363–372, pp. 387–391.

Computer Design, vol. 31, No. 7, Jul. 1, 1992, pp.57–58, 60, 62, 64, T. Williams: "Automation Improves Speed and Accuracy Software Testing".

NTZ Nachrichtentechnische Zeitschrift, vol. 45, No. 9, Sep. 1, 1992, pp. 708–711, Beer A. et al.: "ATG–EIN Testverfahren Fuer Anwenderorlenfierfe Benutzeroherflaechen".

*Primary Examiner*—Ly V. Hua
*Attorney, Agent, or Firm*—William J. Kubida; Richard A. Bachand; Holland & Hart L.L.P.

[57] ABSTRACT

A computer implemented method and computer system for testing a target software product is presented. The method includes constructing a finite state machine in which portions of the target product are ascribed to states of the state machine. The state machine may correspond to a predetermined test case for the target software product. A number of state functions are provided, each of the state functions performing at least one verification on the target software product. The state functions also may include means for transitioning from one state to the next, for example, by a "next window" a "previous window" action if the target software program is a windows based program. The state functions may also verify that a current state in which the state machine exists is a correct state, may verify information that is supposed to have been written to a memory is written in fact to the memory, and may verify that the path to the information is correct. Information is furnished to the state machine for use by the target software product portions ascribed to states of the state machine. The information may include test case information from a test computer to the target software product as required by a test case being performed.

19 Claims, 3 Drawing Sheets

METHOD FOR GENERALIZED WINDOWS APPLICATION INSTALL TESTING FOR USE WITH AN AUTOMATED TEST TOOL

This is a division of U.S. patent application Ser. No. 08/674,355, filed on Jul. 1, 1996 now U.S. Pat. No. 5,870,539.

BACKGROUND OF THE INVENTION

1. Field of the Invention

This invention relates to improvements in computer systems, networks, and the like, and more particularly to improvements in methods and apparatuses for testing computer programs and processes.

2. Relevant Background

Producers of software products generally test their products extensively to ensure proper operation of the products on several different various operating systems and computer models. As software products become more lengthy and complex, the software product tests also have become more lengthy and complex, requiring ever increasing amounts of time to perform. The development of routines to test the software products, therefore, have become of concern, especially considering the market demands of producing adequately tested software in reasonable amounts of time.

Typically, to develop a suitable test for a particular software product, a software test designer studies the product specifications. He then extracts a list of product features, and generates a number of "assertions" regarding the software product (herein the "target program" or "target product.") An assertion is, for example, a specification of the behavior of the target program, or part thereof, when it is operating properly. Thus, an assertion is a statement of how the target program is expected to operate under certain conditions, or other appropriate performance or result oriented product expectation.

For each assertion, the designer then develops a set of software "test cases." The test cases exercise as many as possible of the code paths in the target product to prove the validity of the assertions. If each assertion is proven for a particular computer model and operating system, the software product is considered to be fully tested for that particular system. Thus, for a particular software product, typically the target product is tested on various combinations of computer models and operating systems on which the product may be run.

Typically, features of the target product are not totally independent. For example, most software products are constructed using a number of subroutines, calls, branches, loops, and other program techniques. These techniques perform operations that are common to multiple independent portions of the software, and which therefore are often repeatedly used by different parts of the program in which they are incorporated. Moreover, if the target program is changed, the tester must tediously change each test case to reflect the changes.

In addition to target programs performing various particular functions, sometimes the target programs serve to install still other programs onto a computer or computer system. A test of the target program, therefore, may require an analysis of the computer after the completion of the installation process. The analysis, for instance, may ensure that the files that should have been installed were installed, or that computer configuration steps have left the computer properly configured. In addition, often the target program has various options that it performs along various pathways as a part of or in order to install the underlying program. Thus, it is often desirable for the test program to dynamically test the target program as it performs the various installation procedures of the underlying programs being installed.

SUMMARY OF THE INVENTION

Thus, according to a broad aspect of the invention, a computer implemented method for testing a target software product is presented. According to the method, which may be implemented on a programmed digital computer, a finite state machine is constructed in which portions of the target product are ascribed to states of the state machine. The state machine may correspond to a predetermined test case for the target software product.

A number of state functions are provided. Each of the state functions performs at least one verification on the target software product, and may include means for transitioning from one state to the next, for example, by a "next window," a "previous window," or another similar action if the target software program is a windows based program. The state functions may also verify that a current state in which the state machine exists is a correct state, may verify information that is supposed to have been written to a disk is written in fact to the disk, and may verify that the path to the information is correct.

Information is furnished to the state machine for use by the target software product portions ascribed to states of the state machine. The information may include test case information from a test computer to the target software product as required by a test case being performed.

According to yet another broad aspect of the invention, a computer implemented method for testing a target software product is presented. The method includes creating a finite state machine having a plurality of states, with each state representing a portion of the target software product. The target software product may be a windows-based program in which each portion of the target software product is a window. A verification test is performed in at least one of the states of the state machine on the target software product. Transition edges, which may be "next window,""previous window," or other similar button of a window based target software product, are defined for the state machine with each of the transition edges causing the state machine to move to a next state. At least one test case is performed on the target software product by traversing from a start state to a finish state of the state machine. The test case may be performed by passing a stream of data containing a next action to a current state of the state machine to cause a transition of the state machine from each state to the next.

According to yet another broad aspect of the invention, a computer implemented method for testing a target software product on a computer is presented in which a state machine is constructed having a plurality of states to represent the target software product. The target software product may be a windows based product. Each state has at least an entry command and an exit command, and may perform functional tests in at least some of the states according to predefined test cases. If the target software product is a windows based product, each state of the state machine may correspond to an associated window of the target software product. An evaluation is performed upon an exit from the state machine to determine whether a desired test case result has been achieved, and an indication is provided to a user whether the target software product passed the state and functional tests. In one embodiment, the target software product causes another computer software application to be installed. In this embodiment, the state and functional tests evaluate the another computer software application during the installation.

According to yet another broad aspect of the invention, a computer system is presented having a state machine having a plurality of states, each state having a number of functions associated therewith and having at least one means by which the state may be entered and exited. The state machine is operatively associated with a target computer product in which each state of the state machine corresponds with a set of steps of the target computer product. A number of functions are provided that exercise at least portions of the target computer product. A set of states of the state machine may correspond to a test case for testing the target computer product.

A tester, which may be, for example, a programmed digital computer, is provided for interacting with the state machine. The tester includes means for moving among the various states of the state machine, means for exercising the functions performed within each state of the state machine, and means for performing a test after a movement through a complete predetermined set of the states.

In one embodiment, the target computer product may include a main program and at least one subroutine. The main program may represent a state of the state machine and the subroutine may represent another state of the state machine. In another embodiment, the target computer product may be a windows based program, with each state of the state machine corresponding to a respective window associated with the target computer product. In yet another embodiment, the target computer product comprises a computer program for installing another computer program.

In yet another broad aspect of the invention, a computer program product is presented having a computer useable medium and a computer readable code embodied on the computer useable medium for testing a target computer product. The computer readable code includes computer readable program code devices configured to cause a computer to construct a finite state machine with each state of the finite state machine corresponding to a respective set of program instructions of the target computer product, having at least one transition edge, and at least some of the states having an associated functional test for application to the target computer product. In addition, the computer readable code includes computer readable program code devices configured to cause a computer to effect transitions among the states of the state machine. The computer readable code also includes computer readable program code devices configured to cause a computer to execute the functional test when the state machine is in a state with which the functional test is associated. The computer readable program code devices is also configured to cause a computer to report to a user whether the target computer product passed the functional test.

In one embodiment, the computer readable code additionally includes computer readable program code devices configured to cause a computer to pass data required by the target computer product in respective associated states of the state machine. In one embodiment, the computer readable code includes computer readable program code devices configured to cause a computer to verify a successful operation of the target computer product after all of the states of the state machine have been traversed, or a finish state is reached.

In a preferred embodiment, the target computer product is used to install another computer software product and further comprises computer readable program code devices configured to cause a computer to verify a successful installation of the installed computer software product after all of the states of the state machine have been traversed, or a finish state is reached.

The target computer product may be a windows based program in which the computer readable program code devices are configured to cause a computer to construct a finite state machine with each state of the finite state machine corresponding to a respective window associated with a set of program instructions of the target computer product.

An installation algorithm according to the invention is provided which encodes all the installation pathways as one system and allows all the pathways to be represented. Such algorithm is easily modified when the installation algorithm is changed.

One of the advantages of the method of the invention is that by virtue of the representation of an application to be tested as a state machine in which individual states may be redundantly entered, the testing of the target program can be accomplished without redundant presentation of test code lines or routines, since the test code, as will be apparent, is prepared and run simultaneously with, or in parallel with, the target program.

BRIEF DESCRIPTION OF THE DRAWINGS

The invention is illustrated in the accompanying drawings, in which.

In the various figures of the drawings, like reference numerals are used to denote like or similar parts.

DETAILED DESCRIPTION OF THE PREFERRED EMBODIMENTS

One environment in which the present invention may be used encompasses a general distributed computing system, general purpose computers, workstations, personal computers, or the like, connected by way of communication links of various types in a client-server arrangement, wherein programs and data, many in the form of objects, are made available by various members of the system for execution and access by other members of the system.

Figure 1:
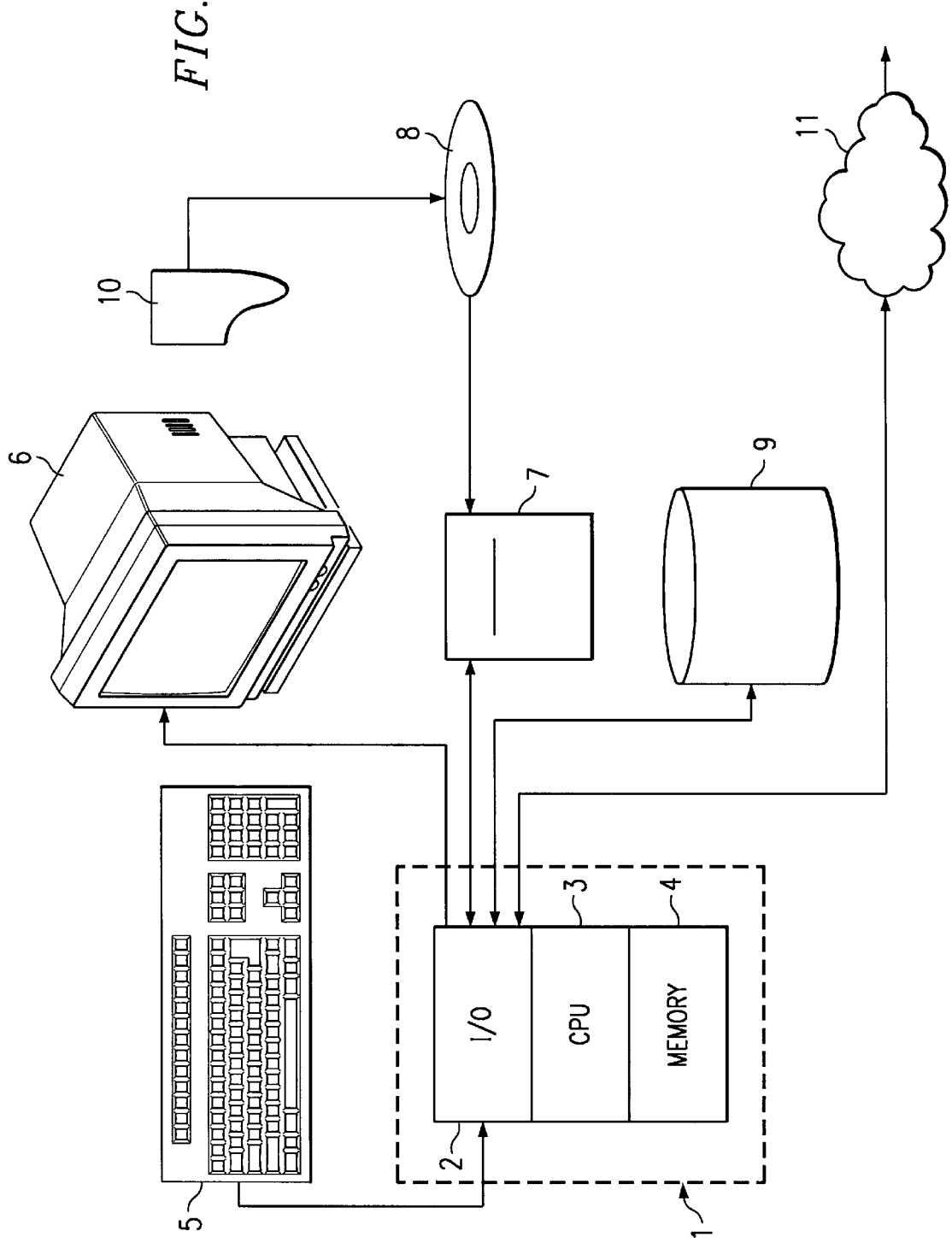
FIG. 1 is a block diagram showing a generalized environment in which the method and apparatus of the present invention may be used.

Some of the elements of a general purpose workstation computer are shown in FIG. 1, wherein a processor 1 is shown, having an input/output ("I/O") section 2, a central processing unit ("CPU") 3, and a memory section 4. The I/O section 2 is connected to a keyboard 5, a display unit 6, a disk storage 9, a CD-ROM drive unit 7, and a network interface 11. The CD-ROM drive unit 7 can read a CD-ROM medium 8, which typically contains programs 10 and data, and which also may contain operating system components. The computer program products which containing mechanisms to effectuate the apparatus and methods of the present invention may reside in the memory section 4, on the disk storage unit 9, on the CD-ROM medium 8, or on the network interfaced by the network interface 11.

This invention provides a method for representing an installation process and implementing an installation test algorithm that is easy to maintain and modify for use with an automated test tool. The following nomenclature is used in the description of test algorithm. "Verification step" is used to refer to an individual test that is performed at a particular stage in the algorithm being tested. "Test case" is used to describe a series of verification steps and the algorithm is traversed from a start to a finish point. "Test suite" is used to refer to the collection of test cases for a particular algorithm.

As will be apparent, the invention is described in the context of a software installation program, and more particularly, to a program for testing a program or process that installs another software program onto a computer. Moreover, in the embodiment illustrated and described, the software installation program is windows based. It should be noted, however, that although a windows based software installation program is described in detail, those skilled in the art will recognize that the invention may be used in conjunction with non-windows based programs, programs that operate as well within themselves, with separate databases, or in other will known modes of operation.

According to the invention, a test suite may be applied to the software installation process via a finite state machine. A "state machine" as used in the context of this application is a representation of a machine or programmed digital computer that can be observed as having a number of discrete "states" in each of which predefined functions are performed and to and from each of which movement is continuously defined. Although a state machine may be represented by a hardware apparatus, preferably the state machine may be a programmed computer that exists in different states, an example of which is a computer that is programmed to operate with a "windows" based application having a plurality of discrete window displays among which a user may selectively "move" or traverse from one to another, with each window representing a machine state.

Typically, state machines are thought of in the context of digital circuitry and movement from one state of the state machine to another is typically thought of being effected by the occurrence of an "edge" of a control pulse. In the context of the present invention, however, the "edges" are represented by a selectable action taken by a user, for example, the actuation of a "push button" that selectively causes another window or window application to be displayed or executed.

The state machine is established with each possible window that appears during the running of the installation program being represented as a state, and each "push button" of the window, or each action that may be selectively initiated by a user to move to another window, being represented by an edge or a transition triggering event in the state machine. Thus, generally, push buttons such as 'Next' and 'Back' serve as edges that cause the state machine to transition to the next or to a previous state. Other means for moving among the various windows may be used, as will be apparent to those skilled in the art. Therefore, in the context of testing a computer product that itself installs a computer program or product, the start state of the state machine is entered with the first window that appears when the install is initiated. The finish start is entered either upon a successful installation or an aborted installation attempt.

In addition, a number of state functions are provided. Each state function is a function for each state for performing one or a series of actions when the state machine is in an associated state and to transition one state to the next, depending upon the particular action taken and data processed in the state. The required actions, information, and data are passed to the state machine in a stream of data. For example, the stream of data may specify a next action, or pass required information or data needed in a window. Although each installation may be differently configured, general settings for any particular installation may be stored in a data structure to which each state function has access. Another example of a state function may be to verify the install application (or application being tested) is currently in its expected state. If an unexpected state is reached, the installation test will fail and report an error. The state function sets any data relevant to the current window. The function verifies the next action from the data stream is a valid action then calls the next state function. When a final state is reached, either as a successful or an aborted installation or completion of the target program, the function verifies that the final state has been reached, then verifies that no more actions exist in the data stream. If actions exist in the data stream an error is logged and the test has failed.

To design test cases, in particular for a software installation program, the installation data structure is filled with specific information about the installation and a data stream is created to guide the process through the installation screens. A starting test case may be created to execute the install and call the initial screen, passing the data stream as a parameter. As each function is performed, it is removed from the data stream, and the next function is called, based upon the successive data stream item. When a function is an end state, control returns to the first test case, which verifies that the data stream is empty. Any failures between the initial function and the end state are reported and the test stops reported an error. After the installation has finished, the program verifies that the installation was properly completed, based upon the data which the test case was provided.

It will be appreciated that when changes to the installation model are implemented, only the finite state machine representing the install need be modified. Thus, instead of modifying each test case, only the one set of functions needs to be modified to represent the new finite state machine. To code each pathway through the installation, only the data stream needs to be written, since the entire pathway is coding though the state functions. This approach makes coding the install pathways much easier and since all the pathways are coding by using the finite state machine approach, maintenance is much easier than the conventional method.

Figure 2:
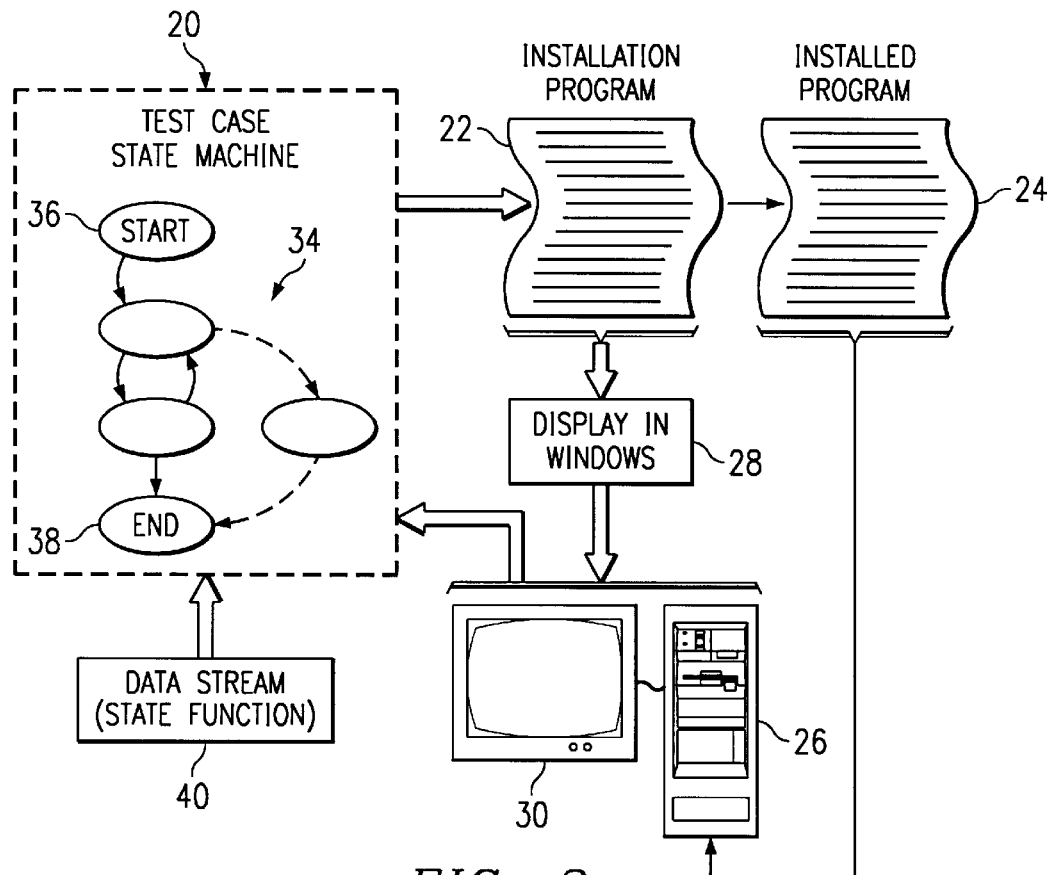
FIG. 2 is a conceptual diagram showing the general interrelationship of the state machine, installing computer program, installed computer program, and computer on which they are run and installed, in accordance with one preferred embodiment of the invention.

A conceptual diagram showing the interrelationship of a state machine 20 performing test operations on an installation program 22 in its operation of installing an installed program 24 onto a computer 26 is shown in FIG. 2. In the embodiment illustrated in FIG. 2, an installation program 22 is the target for the test or tests being performed by the state machine 20. In the embodiment illustrated, the program 22 is a software installation program, the purpose of which is to install another program, denoted the "installed program" 24. It should be noted that although the program 22 is an installation program, the principles of the invention may be equally advantageously employed to other types of programs, as mentioned above.

In the normal running of the program 22, the program may require various user inputs for operation. For example, in the case of an installation program of the type herein-described, the program may ask the user to identify the various paths, disks, and so forth through which and onto which the installed program 24 is to be located after installation. In addition, the installation program 22 may require other types of command inputs from the user. For example, the program 22 may periodically inquire the user to specify whether the user desires to continue an installation after a particular event has occurred or to abort the installation. In some cases, the installed program may have an configurable form which may be specified by the user to be installed.

In order to receive the various inputs from the user, in a preferred embodiment, various windows may be displayed. Windows based programs are well known in the art and are not described in detail herein, other than to note that a particular window may provide "push buttons," or other window transitioning means, that can be selectively activated by a user operated pointing device or which may contain user input information boxes to enable the user to specify information to the installation program 22, as noted above. In addition, the displayed windows provide information to the user indicating information about the operation of the installation program 22, such as the system requirements for the installed program 24, a percentage of the installed program 24 that has been installed at any particular instantaneous moment, and so on. Thus, the installation program 22 provides a display 28 in a sequence of windows on the computer system monitor 30.

In order to test the installation program 22, a state machine 20 is defined having a number or set of states 34 therein. The states 34 proceed from a start state 36 to an end state 38 with each state in the set 34 representing a portion of the installation program 22. In a preferred embodiment, in which the installation program 22 is a windows based program, each state in the set of states 34 may represent one of the windows that is displayed to the user throughout the consecutive sequencing of steps during the operation of the installation program 22. State machine 20, in the embodiment shown, is configured to monitor a particular test case for the installation program 22. As an example of an appropriate test case, the state machine 20 may start at a start state 36 in which the installation program 22 starts and proceeds through a normal installation of the install program 24 through completion at an end state 38. Another test case that may be defined could be an abbreviated installation of the install program 24. Other test cases, of course, will be apparent to those skilled in the art.

The operation of the installation program 22 is essentially controlled by the state machine 20 which operates as a superintending control thereof. Since, in the preferred windows environment, the individual states of the state machine 20 each represent respective successive windows that are displayed as a result of the operation of the installation program 22, with the windows requiring various user inputs, as described above, data 40 is provided to the state machine 20 for delivery to the particular windows input sections of the respective windows that are displayed during the operation of the installation program 22. Examples of such data that may be provided, for example, may be the specification of the disk and path to which the install program 24 is to be installed. The movement from one window to the next via the windows "push buttons," other transitioning means, and so on. It can therefore be seen that in the definition of the individual states in the set of states 34 of the state machine 20, various transition triggers may be defined conveniently as the actuation of push buttons in the individual windows that are generated during the operation of the installation program 22.

It should also be noted that the various parts of the drawing of FIG. 2 that include the state machine 20, data stream 40, installation program 22, installed program 24, the display 28, and so forth may be operated in the same computer 26 concurrently. The installation program 22 may, for example, be contained on a floppy disk or other appropriate media for reading and operation in known manner by the computer 16.

Figure 3:
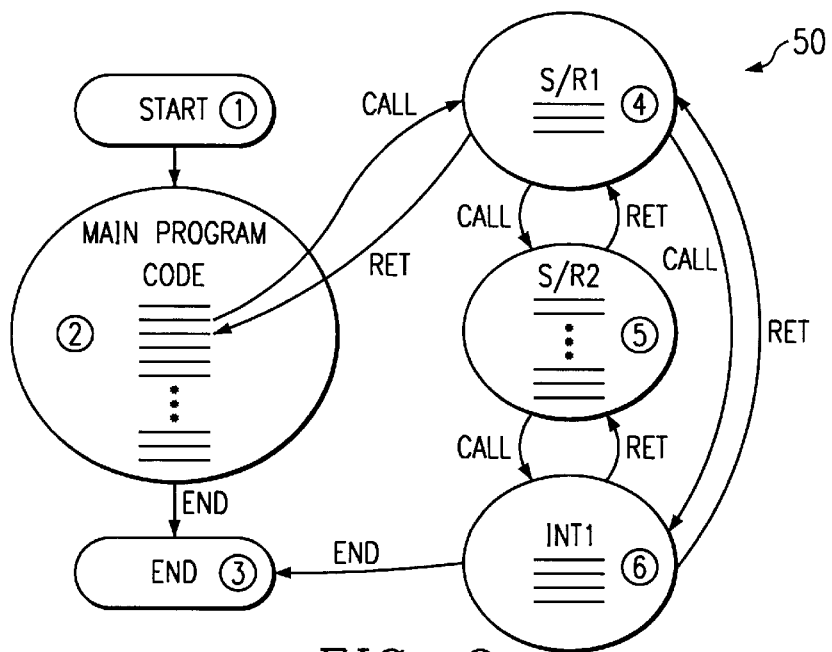
FIG. 3 is a diagram illustrating a state machine representation of a software application for testing the software application, in accordance with a preferred embodiment of the invention.

More particularly, as shown in FIG. 3, a software application is illustrated which has been generalized is represented by a number of states forming a state machine. In representing the software application as a state machine, the various states of the state machine may be defined to each represent discrete segments of the software application code. For example, a first state, state one, may be a start state. The next state, state 2, may be the main code portion of the program, and the last state may be an end state, state 3. Of course, depending upon the code of the particular program being represented, other states may be defined as appropriate, taking into consideration the particular types of tests desired to be run, the discreteness of individual code segments, and other similar considerations.

In addition, other discrete portions of the application may be defined as states. For example, as shown, subroutine portions may be individually identified as states, as shown by states 4 and 5. In addition, interrupt states, such as the interrupt shown, may be represented as states of the state machine, such as state 6 shown. Other discrete code portions similarly may be represented by states.

In defining the various states of the state machine, the considerations may include the particular function performed by the individual code portion and whether a definite entrance and exit are sufficiently defined within the code to enable a state to be properly defined. Thus, for example, in a typical programming language program, a subroutine is a good candidate for defining a machine state, since a subroutine has strict entry and exit protocols or rules and generally performs a testable function in its operation. Similarly, an interrupt may also be a good candidate for defining a machine state since it likewise has well defined entry and exit protocols and typically performs a function that can be tested as well.

Another class of programs that lend themselves well to being represented by a state machine are those programs that are constructed in a windows based environment. Typically, such programs can be represented as a state machine by defining each window as a state of the state machine being defined. Moreover, typically, windows may have "buttons" that may be "pushed" to move from one window to another, thereby defining strict "edges" by which movement among the states of the state machine can be affected. It will be understood that the "pushing" of a button in the context of the present invention as performed by a superintending test program, below defined, rather than by a user using a mouse or other pointing device.

Figure 4:
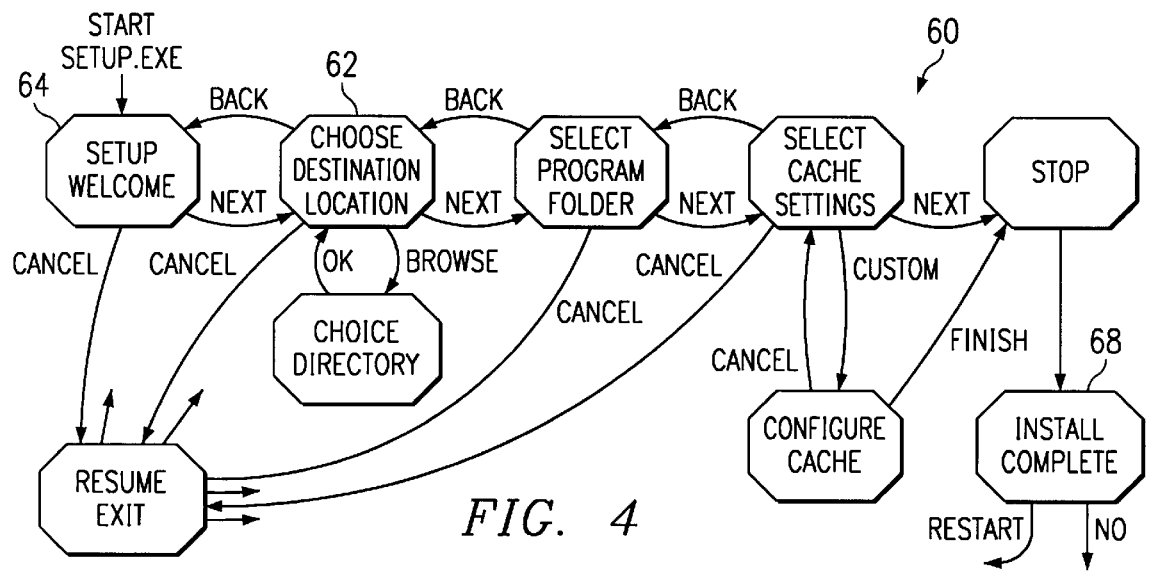
FIG. 4 is a state machine diagram generated for testing a software installation application in accordance with a preferred embodiment of the invention.

With reference now to FIG. 4, a diagram showing a state machine 60 representation of a windows based target software application, which installs another software program, and its relationship to a test program (illustrated in FIG. 5), in accordance with the invention, is shown. The particular target software application illustrated is an installation program for a software program entitled "PC-Cache" available from SunSoft, Inc. of Mountain View, California. "PC-Cache" installs a program for providing a caching operation in personal computers, or the like. It should be noted that although a specific target software program, "PC-Cache," is installed according the embodiment illustrated in FIG. 4, any target program can be installed in practicing the method of the invention in a general sense. Moreover, as mentioned above, although the target program that is represented by a state machine 60 is a software application installation program, the invention is not intended to be limited to such type program. Finally, although the target program represented by a state machine is described as a windows based program, a windows type program construction also is not intended to be a limitation on the method of the invention.

The normal running of the "PC-Cache" target software application results at its conclusion with a number of files being written onto a hard drive or disk of a computer, computer system, or computer network server. More particularly, the files are written to a specific path that is specified by the user when the user performs the installation process. Thus, in normal operation, as the installation progresses from start to finish, the user is asked to identify the path to the files to be installed, and may be asked various other questions regarding the nature of the installation, for example, whether to accept default program settings or whether the user may wish to specify particular program settings. At various points in the installation process, the user may be asked whether the process should be aborted or continued, and various other user inputs also may be required.

In the testing of the target program, the various functions that are required of the user, for example, the specification of the path to the files to be installed, the answer to the queries regarding continuing and aborting installation, and so on, are performed by a superintending test program. More specifically, in accordance with the invention, a state machine is created in which a number of test cases to test the target program are defined with an intention of running each test case on a computer to insure that the target program represented by the state machine will properly operate in various computer environments. Thus, one test case, for example, that may be run is one in which each successive window is sequentially entered and exited until an end state is achieved, corresponding, for example, to a normal installation that may be performed by a user accepting custom defaults provided by the program, and so on.

In defining the state machine 60 corresponding to the windows based PC-Cache program, a state of the state machine is defined for each window that is displayed by the graphical user interface as the installation program is run. The "edges" or transition triggering events are represented by the "push button" user selectable options in each window. In one window 62, for example, the specification of a path to which the files of the PC-Cache program are to be installed is a required input by the user as a field. Thus, the entry of information into the field is a testable function that is performed in one of the windows represented by the state machine 60.

The superintending program in the case of an installation program of the type described with respect to the embodiment of FIG. 4 operates in parallel or simultaneously with the running of the installation program represented by the state machine 60 shown. In addition, as mentioned, the superintending program provides tests at each state of the state machine to: (1) insure that the state of the state machine that is supposed to be operated is, in fact, in existence, (2) that the transition triggering triggers exist in the state in which the state machine exists, and (3) performs tests on the state to insure that the functions to be performed in the state exist, and in some cases, operate properly. It will be appreciated that many of the functions that are performed by the individual states of the state machine are not immediately testable. Thus, for example, if the state machine 60 is intended in a particular state to install a number of files of the program being installed, the completion of the state and the transition to the next state must be achieved before the actual functions complete. As a result, the superintending program includes a number of tests that are performed at the conclusion of the test case to complete any such functional testing. An example, for instance, may be to look to the path in which the files of the program being installed are to be written and comparing the files that are written to those that are expected to have been written therein. If none or only a few files are found in the path, an error message may be displayed. On the other hand, if the particular test case being run involves an abort at a point prior to the installation of the files and the final test shows, nevertheless, that the files intended to be installed were or exist in the path to which they should have been written under normal circumstances, an error message is likewise displayed.

Figure 5:
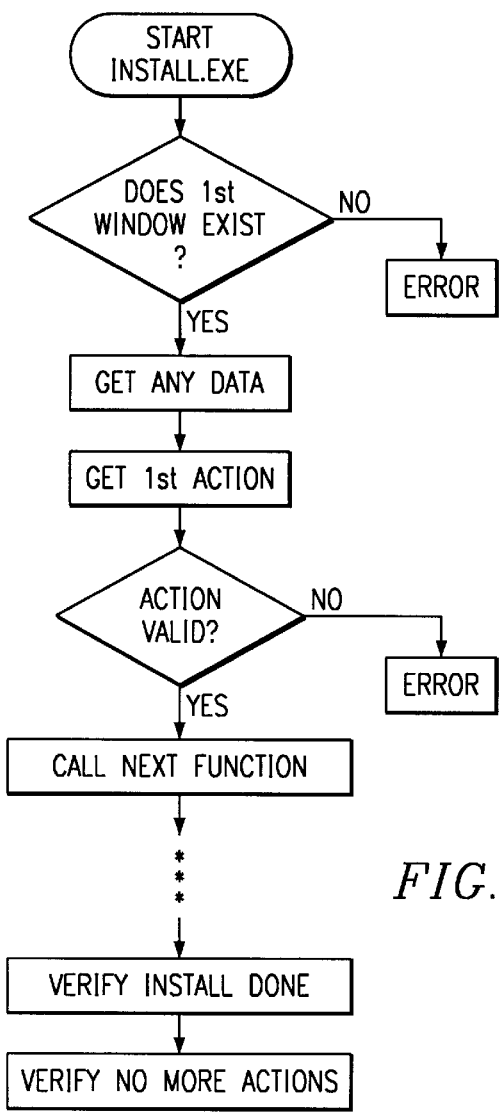
FIG. 5 is a representation of a portion of a test program to test the software installation application for which the state machine has been generated, according to FIG. 4, illustrating state function tests for one state of the state machine and overall completion tests after the state diagram has been traversed.

A portion of the superintending program that is run as a part of the test cases of the state machine 60 is shown in FIG. 5. When the target program is started, by a "start install.exe" command, the first state 64, of the state machine 60 is entered, which is a "setup welcome" state. If properly operating, the user sees a "welcome" window, which conveys particular information about the program. The superintending program verifies that the first window, in fact, exists. If it does not, an error message is generated. If it does exist, the superintending program fetches any required data, and executes any action. The data and actions may be contained in an accompanying database, if desired.

The action is then tested to insure that it is a valid action. If the action is a valid action, it is executed, if not, an error message is generated. The next function is then executed, for example, corresponding to the next state 62 of the state machine 60, which, in the example illustrated is "choose destination location". In this example, this specifies the path and disk to which the program being installed is to be located.

After the various states of the state machine 60 have been traversed for the particular test case being performed, a verification is made to insure that the result that was supposed to have been achieved was in fact achieved. In the case of a program being installed, for example, the result should be the writing of predefined files to the hard disk. A verification, therefore, would include a check to see that the particular files which should have been written exist on the disk at the specified location. After a verification has been made that no more actions are specified, the installation is complete, as indicated by state 68. If more test cases are to be performed, the state machine can be re-entered and traversed, as indicated, or the test suite may be declared complete and ended.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A computer implemented method for testing a target software product, comprising the steps of:
   providing for constructing a finite state machine in which portions of said target product are ascribed to states of said state machine;
   providing for furnishing state functions, each to perform at least one verification on said target software product within a respective state of said finite state machine, wherein each of said respective states of said finite state machine corresponds to a set of program instructions of said target software program; and
   providing for furnishing information to said state machine for use by said target software product portions ascribed to states of said state machine.

2. The computer implemented method of claim 1 wherein said step of providing for furnishing information to said state machine comprises providing for furnishing data required by at least one portion of said target software product ascribed to one of said states of said finite state machine.

3. The computer implemented method of claim 1 wherein said step of providing for furnishing information to said state machine comprises providing for furnishing a next window command to transition from a current state of said finite state machine to another state of said finite state machine, and to cause said target computer product to display a next window to a user.

4. The computer implemented method of claim 1 wherein said target software product is a windows based computer program and said step of providing for constructing a finite state machine includes providing for constructing each state to represent a respective window associated with said target software product.

5. The computer implemented method of claim 1 wherein said step of providing for constructing a finite state machine comprises providing a command for a transition to another window as a state transition command.

6. The computer implemented method of claim 1 wherein said step of providing for constructing a finite state machine comprises providing for defining a "next window" action as a state transition command.

7. The computer implemented method of claim 1 wherein said step of providing for constructing a finite state machine comprises providing for defining a "previous window" action as a state transition command.

8. The computer implemented method of claim 1 wherein said step of providing for constructing a finite state machine comprises providing for representing a start state as a first window that appears after the target software product is started, and a finish state as either a successful or aborted running of said target software product.

9. The computer implemented method of claim 1 wherein said step of providing for furnishing information to said state machine comprises providing for furnishing an information input to receive user supplied information.

10. The computer implemented method of claim 1 wherein said step of providing for furnishing information to said state machine comprises providing for furnishing an information input to receive user supplied information include furnishing user supplied commands.

11. The computer implemented method of claim 1 wherein said step of providing for furnishing state functions comprises providing for furnishing a state function for verifying that a current state in which the state machine exists is a correct state.

12. The computer implemented method of claim 1 wherein said step of providing for furnishing state functions comprises providing for furnishing a state function for verifying information that is supposed to have been written to a disk is written in fact to the disk.

13. The computer implemented method of claim 12 wherein said step of providing for furnishing state functions comprises providing for furnishing a state function for verifying that a path to which the information is to written is a same path as that to which the information should be written.

14. The computer implemented method of claim 1 wherein said step of providing for furnishing state functions comprises providing for furnishing a state function for verifying a window that is displayed is a correct window.

15. The computer implemented method of claim 1 wherein said step of providing for furnishing state functions comprises providing for furnishing a state function for verifying transition to a next window causes a correct window to be displayed.

16. The computer implemented method of claim 1 wherein said step of providing for furnishing state functions comprises providing for furnishing a state function for performing a verification at an end of said test case.

17. The computer implemented method of claim 16 wherein said step of providing for furnishing state functions comprises providing for furnishing a state function for verifying that any files that were to be written during a test case were written.

18. The computer implemented method of claim 16 wherein said step of providing for furnishing state functions when said test case ended in an abort comprises providing for furnishing a state function for verifying that no files were to written during said test case.

19. The computer implemented method of claim 1 wherein said step of providing for furnishing information to said state machine comprises providing for furnishing required test case information from a test computer to said target software product as required by a test case being performed.

* * * * *